United States Patent
Sharma et al.

(10) Patent No.: US 12,455,103 B2
(45) Date of Patent: Oct. 28, 2025

(54) CONDUCTIVE PROTRUSION ASSEMBLY FOR AN EVAPORATOR OF AN ICE-MAKING MACHINE

(71) Applicants: Ram Prakash Sharma, Haryana (IN); Vinay Sharma, Haryana (IN)

(72) Inventors: Ram Prakash Sharma, Haryana (IN); Vinay Sharma, Haryana (IN)

(73) Assignees: Ram Sharma (IN); Vinay Sharma (IN)

( * ) Notice: Subject to any disclaimer, the term of this patent is extended or adjusted under 35 U.S.C. 154(b) by 217 days.

(21) Appl. No.: 18/272,983

(22) PCT Filed: May 11, 2021

(86) PCT No.: PCT/IB2021/053992
§ 371 (c)(1),
(2) Date: Jul. 18, 2023

(87) PCT Pub. No.: WO2022/200843
PCT Pub. Date: Sep. 29, 2022

(65) Prior Publication Data
US 2024/0077242 A1    Mar. 7, 2024

(30) Foreign Application Priority Data
Mar. 26, 2021   (IN) .............................. 202111013343

(51) Int. Cl.
*F25C 1/08* (2006.01)
*F28D 15/04* (2006.01)

(52) U.S. Cl.
CPC .............. *F25C 1/08* (2013.01); *F28D 15/04* (2013.01)

(58) Field of Classification Search
CPC .... F25C 1/24; F25C 1/00; F25C 5/185; F25C 5/10; F25C 5/08; F25C 1/22; F25C 5/02;
(Continued)

(56) References Cited

U.S. PATENT DOCUMENTS

| | | | |
|---|---|---|---|
| 2,585,240 A | 2/1952 | Grow | |
| 3,338,065 A | 8/1967 | Ashley | |
| 3,418,823 A * | 12/1968 | Salimbeni Vivai | ....... F25C 1/08 |
| | | | 62/138 |

FOREIGN PATENT DOCUMENTS

| EP | 2869003 | 5/2015 |
|---|---|---|
| GB | 758982 | 10/1956 |

OTHER PUBLICATIONS

International Preliminary Report on Patentability in International Appln. No. PCT/IB2021/053992, mailed on Sep. 29, 2022, 5 pages.
(Continued)

*Primary Examiner* — Jerry-Daryl Fletcher
*Assistant Examiner* — Dario Antonio Deleon
(74) *Attorney, Agent, or Firm* — Fish & Richardson P.C.

(57) ABSTRACT

A conductive protrusion assembly (100) is disclosed. The conductive protrusion assembly (100) includes a conductive cup (1) defining a chamber (C). The conductive cup (1) is supportable by a support plate (8) of the evaporator (101). A conductive lid (2) is fixed within the chamber (C), dividing the chamber into a cooling section (A) and an insulating section (B) where, the insulating section (B) of the conductive cup (1) is packed with an insulation material. The conductive lid (2) is defined with an inlet port (15a) and an outlet port (15b) for circulate a cooling fluid through the cooling section (A) and the insulating section (B) is defined with a flow passage to allow flow of a defrost fluid. The conductive protrusion assembly (100) with an insulating section (B) and a cooling section (A) enables spherical shaped ice blocks (7) to be produced without the use of a mould.

19 Claims, 16 Drawing Sheets

(58) Field of Classification Search
CPC . F25C 1/08; F28D 20/025; F28D 1/06; F28D 2021/0071; F28D 7/1623; F28D 15/04; F25D 23/068
See application file for complete search history.

(56) References Cited

OTHER PUBLICATIONS

International Search Report and Written Opinion in International Appln. No. PCT/IB2021/053992, mailed on Dec. 23, 2021, 8 pages.

* cited by examiner

CONDUCTIVE PROTRUSION ASSEMBLY FOR AN EVAPORATOR OF AN ICE-MAKING MACHINE

TECHNICAL FIELD

Present disclosure in general relates to a field of refrigeration. Particularly, but not exclusively, the present disclosure relates to an ice-making machine. Further embodiments of the present disclosure disclose an evaporator for making spherical shaped ice blocks from the ice-making machine.

BACKGROUND OF THE DISCLOSURE

Ice may be formed by exposing water to sub-zero temperatures. When water is exposed to sub-zero temperatures i.e., freezing temperatures, water turns from a liquid state to a solid state. Ice of different shapes and sizes may be produced by moulds of predetermined shapes. Initially, water that is to be frozen is poured into a mould of predetermined shape. The mould is then exposed to sub-zero temperatures which causes the water in the mould to freeze. As the water turns into a solid state, the water acquires the shape of the mould and thus ice blocks in the shape of the mould may be obtained.

Generally, household refrigerators use ice trays of different shapes, wherein the refrigerators and the ice trays may be suitable to produce a small quantity of ice blocks. However, certain sectors such as food sector, beverage sector, cold storage sectors etc. use large quantities of ice with specific requirement in shape and size. Ice of smaller sizes may be generally used in the food/beverage sectors such as restaurants and hotels. In recent times, the food and beverage industries have had an increased demand for ice. Hence, there exists a need in the food/beverage sector to manufacture ice in large quantities in a shorter period of time. The different shapes of ice that may be served in the food and the beverage industries also seems to be aesthetically pleasing to the consumers.

The above-mentioned process may be time consuming and tedious and thus production of large quantities of ice becomes difficult. Also, ice blocks that are produced conventionally may break during harvest. Further, a smaller area (i.e., only the ice trays) is required to be cooled for producing ice, however, since the ice trays are placed in a large chamber, the complete chamber is cooled just for the purpose of solidifying water in the ice trays. Hence, the above-mentioned method of producing ice may not be efficient.

With advancements in technology, automatic ice making machines which may eliminate the use of moulds are developed. Generally, such kind of ice-making machines are used in sectors which require ice in bulk quantities such as food or beverage sectors or industries. Such ice-making machines includes a plate defined with a plurality of through openings. A plurality of conductive protrusion assemblies extend from the openings, and the tips of the conductive protrusion assemblies consists of thermally conductive metal. Further, the machine comprises a means for supplying a refrigerant fluid to the tips, to extract heat from the tips and thereby cool them to ice forming temperature. The above-mentioned type of ice making machines are generally used for making spherical shaped ice blocks. A second means is configured to spray water onto the surface of the plate and the water from the surface of the plate drains down to the tips of the conductive protrusion assemblies where ice may progressively form on the tips, and the tips may be subsequently heated to release the ice from the tips to drop downwardly, during harvesting. However, such ice making machines and apparatus may be slow and inefficient for forming ice blocks.

In the conventional ice making machines, refrigerant is circulated throughout conductive protrusion assemblies and towards the tip of the conductive protrusion assemblies. As a result, ice may not only be formed at the tip of the conductive protrusion assemblies, but the ice formed may extend throughout the length of the conductive protrusion assemblies. Consequently, the ice blocks formed on the conductive protrusion assemblies are not exactly spherical in shape and the ice blocks may have an irregular oval shape, where the bottom end of the ice block seems to be spherical, and the top end extends in an elongated manner. Further, since the refrigerant is circulated throughout the conductive protrusion assemblies, entire or substantial length of the conductive protrusion assembly may be cooled which may reduce the cooling efficiency. Since, the circulated refrigerant cools a larger surface area, this may also reduce overall efficiency of the ice making machine.

The present disclosure is directed to overcome one more problems stated above, or any other such problems associated with the prior art.

The information disclosed in this background of the disclosure section is only for enhancement of understanding of the general background of the invention and should not be taken as an acknowledgment or any form of suggestion that this information forms the prior art already known to a person skilled in the art.

SUMMARY OF THE DISCLOSURE

One or more shortcomings of the conventional systems are overcome by providing plurality of conductive protrusion assemblies that are divided into a cooling and an insulating section. The conductive protrusion assemblies are configured to come in contact with the water that is sprayed during the cooling cycle. Since, the conductive protrusion assembly is divided into insulating and cooling sections, the ice blocks are formed with a better spherical shape and the overall operational efficiency of the evaporator is improved.

In a non-limiting embodiment of the present disclosure, a conductive protrusion assembly for an evaporator of an ice-making machine is disclosed. The conductive protrusion assembly includes a conductive cup defining a chamber. The conductive cup is supportable by a support plate of the evaporator and a conductive lid is fixed within the chamber. The conductive lid divides the chamber into a cooling section and an insulating section where, the insulating section of the conductive cup is packed with an insulation material. The conductive lid is defined with an inlet port and an outlet port for circulate a cooling fluid through the cooling section and the insulating section is defined with a flow passage to allow flow of a defrost fluid.

In an embodiment of the disclosure, the conductive protrusion assembly includes a conductive strip extending from the conductive lid into the cooling section of the conductive cup.

In an embodiment of the disclosure, the conductive strip is configured between the inlet port and the outlet port defined on the conductive lid and, the conductive strip separates the cooling section into an inlet section and an outlet section.

In an embodiment of the disclosure, the conductive protrusion assembly the inlet section is in fluid communication with the first tube for receiving the refrigerant from the first tube and the outlet section is in fluid communication with the second tube for directing the refrigerant out of the cooling channel.

In an embodiment of the disclosure, the conductive cup is defined with a flange at a brim, where the flange is receivable by the support plate for supporting the conductive cup.

In an embodiment of the disclosure, the flow passage is defined proximal to the flange, and the defrost fluid conductively transfers heat to the conductive cup.

In an embodiment of the disclosure, the thermal conductivity of a material of the conductive protrusion assembly is higher than the thermal conductivity of a material of the support plates.

In a non-limiting embodiment of the present disclosure, an evaporator for an ice making machine is disclosed. The assembly includes a frame and at least one support plates supported by the frame. A water flow line is provided at atop end of the frame, where the water flow line is positioned upstream to each of the at least one support plates. Each of the at least one support plates are defined with at least one first provision where each of the at least one first provisions are configured to receive a conductive protrusion assembly. The conductive protrusion assembly includes a conductive cup defining a chamber. The conductive cup is supportable by a support plate of the evaporator and a conductive lid is fixed within the chamber. The conductive lid divides the chamber into a cooling section and an insulating section where, the insulating section of the conductive cup is packed with an insulation material. The conductive lid is defined with an inlet port and an outlet port for circulate a cooling fluid through the cooling section and the insulating section is defined with a flow passage to allow flow of a defrost fluid.

The foregoing summary is illustrative only and is not intended to be in any way limiting. In addition to the illustrative aspects, embodiments, and features described above, further aspects, embodiments, and features will become apparent by reference to the drawings and the following description.

BRIEF DESCRIPTION OF THE ACCOMPANYING DRAWINGS

The novel features and characteristic of the disclosure are set forth in the appended description. The disclosure itself, however, as well as a preferred mode of use, further objectives, and advantages thereof, will best be understood by reference to the following description of an illustrative embodiment when read in conjunction with the accompanying figures. One or more embodiments are now described, by way of example only, with reference to the accompanying figures wherein like reference numerals represent like elements and in which.

Figure 1:
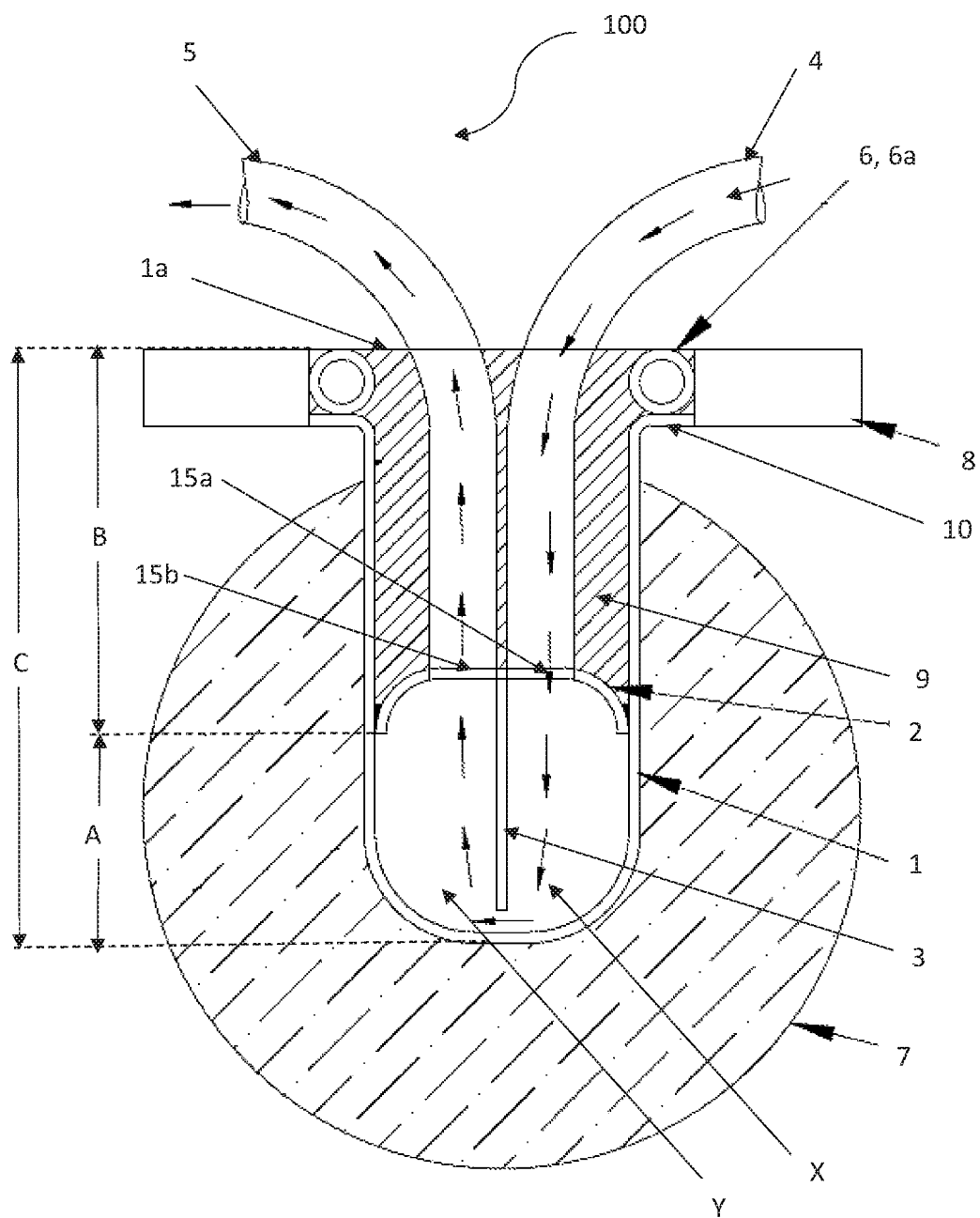
FIG. 1 illustrates a side view of a conductive protrusion assembly, in accordance with an embodiment of the present disclosure.

The figures depict embodiments of the disclosure for purposes of illustration only. One skilled in the art will readily recognize from the following description that alternative embodiments of the system illustrated herein may be employed without departing from the principles of the disclosure described herein.

DETAILED DESCRIPTION

The foregoing has broadly outlined the features and technical advantages of the present disclosure in order that the description of the disclosure that follows may be better understood. Additional features and advantages of the disclosure will be described hereinafter which form the subject of the disclosure. It should be appreciated by those skilled in the art that the conception and specific embodiments disclosed may be readily utilized as a basis for modifying or designing other devices for carrying out the same purposes of the present disclosure. It should also be realized by those skilled in the art that such equivalent constructions do not depart from the scope of the disclosure. The novel features which are believed to be characteristic of the disclosure, as to its organization, together with further objects and advantages will be better understood from the following description when considered in connection with the accompanying figures. It is to be expressly understood, however, that each of the figures is provided for the purpose of illustration and description only and is not intended as a definition of the limits of the present disclosure.

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described below. It should be understood, however that it is not intended to limit the disclosure to the particular forms disclosed, but on the contrary, the disclosure is to cover all modifications, equivalents, and alternative falling within the scope of the disclosure.

The terms "comprises", "comprising", or any other variations thereof, are intended to cover a non-exclusive inclusion, such that an assembly that comprises a list of components does not include only those components but may include other components not expressly listed or inherent to such assembly. In other words, one or more elements in the device or assembly proceeded by "comprises . . . a" does not, without more constraints, preclude the existence of other elements or additional elements in the assembly.

Embodiments of the present disclosure discloses a conductive protrusion assembly for an ice-making machine. Conventionally, refrigerant may be circulated throughout conductive protrusion assemblies and towards the tip of the conductive protrusion assemblies in ice making machines. As a result, ice may not only form at the tip of the conductive protrusion assemblies but may also extend throughout the length of the conductive protrusion assemblies. Consequently, the ice blocks formed on the conductive protrusion assemblies may not be spherical in shape and may form an irregular shape such as oval shape, where the bottom end of the ice block seems to be spherical, and the top end would extend in an elongated manner. Further, since the refrigerant is circulated through the entire or the substantial length of the conductive protrusion assemblies, a larger surface area (i.e., the overall length of the conductive protrusion assemblies) will be cooled, due to which the overall efficiency of the ice making machine is significantly reduced.

The present disclosure discloses a conductive protrusion assembly for an evaporator of an ice-making machine to overcome the limitations of the conventional conductive protrusion assemblies.

According to various embodiments of the disclosure, an evaporator for an ice making machine is disclosed. The assembly includes a frame and at least one support plate supported by the frame. A water flow line is provided at a top end of the frame, where the water flow line is positioned upstream to each of the at least one support plates. Each of the at least one support plates are defined with at least one first provision where each of the at least one first provision is configured to receive a conductive protrusion assembly. The conductive protrusion assembly includes a conductive cup defining a chamber. The conductive cup is supportable by a support plate of the evaporator and a conductive lid is fixed within the chamber. The conductive lid divides the chamber into a cooling section and an insulating section where, the insulating section of the conductive cup is packed with an insulation material. The conductive lid is defined with an inlet port and an outlet port for circulating a cooling fluid through the cooling section. The insulating section is defined with a flow passage to allow flow of a defrost fluid. The following paragraphs describe the present disclosure with reference to FIGS. 1 to 8. In the figure, neither the complete icemaking machine nor the complete assembly shown for the purpose of simplicity. Also, in the figures, a vertical flow type of icemaking machine has been shown, but the same should not be considered as a limitation to the present disclosure, as the conductive protrusion assembly may be employed in other type of icemaking machines including but not limiting to horizontal type icemaking machine.

FIG. 1 illustrates a side view of a conductive protrusion assembly (100). The conductive protrusion assembly (100) includes a conductive cup (1). In an embodiment, the conductive cup (1) may be made of a metallic material or alloy including copper, aluminium, or other conductive material. The conductive cup (1) may be defined by a chamber (C) which may further be separated into a cooling section (A) and an insulating section (B) by a conductive lid (2). The conductive lid (2) may be attached inside the conductive cup (1) at a predetermined distance such that the conductive cup (1) is separated into two sections, and the tip of the conductive protrusion assembly (100) becomes the cooling section (A). The cooling section (A) of the conductive protrusion assembly (100) may further be separated into an inlet and an outlet sub-section (X and Y) by providing a conductive strip (3). The conductive strip (3) may extend substantially vertically from the centre of the conductive lid (2) such that the cooling section (A) is partially divided into two sub-sections i.e., the inlet and the outlet sub-sections (X and Y). Further, the conductive strip (3) vertically extends from the conductive lid (2) such that, there exists a predetermined amount of gap between the bottom most surface of the conductive cup (1) and the bottom end of the conductive strip (3). The gap between the bottom most surface of the conductive cup (1) and the bottom end of the conductive strip (3) acts as a passage for the fluid/refrigerant. Further, the insulating section (B) that is separated by the conductive lid (2) from the cooling section (A) may be filled with a suitable insulation material (9). The insulation material (9) in the insulating section (B) may be polyurethane foam or other type of suitable material. Further, a first tube (4) and a second tube (5) may extend through the insulation material (9) in the insulating section (B). The insulation material (9) may be defined with a flow channel for accommodating the first tube (4) and the second tube (5). The first and the second tubes (4 and 5) serve as a channel for the flow of refrigerant or a cooling fluid. In an embodiment, the flow channel configured in the insulation (9) may direct the refrigerant or the cooling fluid. The conductive lid (2) may be provided with suitable openings to which the first and second tubes (4 and 5) are attached. The conductive lid (2) may be defined with an inlet port (15*a*) and an outlet port (15*b*). The inlet port (15*a*) may be fluidically connected to the first tube (4) and the outlet port (15*b*) may be fluidically connected to the second tube (5). The inlet port (15*a*) and the outlet port (15*b*) on the conductive lid (2) enable the refrigerant to flow from the first tube (4) into the cooling section (A). The first and the second tubes (4 and 5) that are attached to the cooling section (A), are provided on sides of the conductive strip (3). These first and second tubes (4 and 5) may be surrounded by insulation (9) such that the cooling effect from the refrigerant that flows in the first and second tubes (4 and 5) is minimum at the surface of the conductive cup (1) in the insulating section (B). Further, at least one second provisions (6*a*) are defined in the insulation (9) and the second provisions (6*a*) extend in a direction perpendicular to the flow channels in the insulation (9). The second provisions (6*a*) may be configured at the top end of the insulation (9)

and the second provision (6a) may be provided above a flange (10) of the conductive cup (1). The second provision (6a) may accommodate a heating tube (6) where a suitable hot fluid or liquid which is referred as defrost fluid may be circulated during a harvest cycle. The top end of the conductive cup (1) may be curved to extend in a horizontal direction such that the top end of the conductive cup (1) defines the flange (10). The flange (10) may be provided at brim of the conductive cup and act as a supporting member. The support plate (8) may be provided with a plurality of first provisions (1a) where the flange (10) of the conductive cup (1) is housed on the support plate (8). In an embodiment, the support plate (8) may be made of plastic or other suitable non-conductive material.

Figure 2:
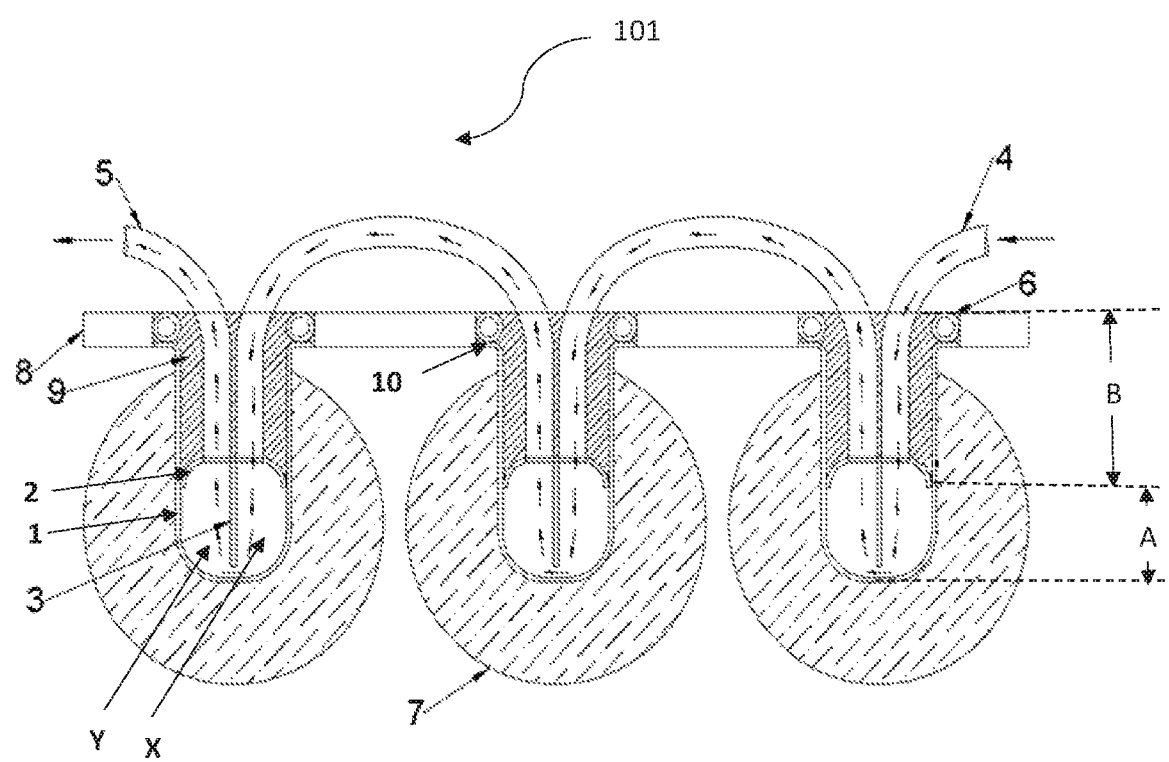
FIG. 2 illustrates a side view of an evaporator for a horizontal spray type ice making machine, in accordance with an embodiment of the present disclosure.

FIG. 2 illustrates a side view of an evaporator (101) for an ice making machine. The evaporator (101) includes a support plate (8), which may comprise of multiple platforms for housing a plurality of conductive protrusion assemblies (100). Each of the conductive protrusion assemblies (100) comprises of a flange (10) formed at a brim of the conductive cup (1) which extends in the horizontal direction. These flanges (10) of each of the conductive cups (1) are suitably housed or supported by the platform of the support plate (8). FIG. 2, discloses three conductive protrusion assemblies (100) that are connected with each other, however the same should not be considered as a limitation to the present disclosure.

The formation of ice around the conductive protrusion assemblies (100) may be explained in two cycles—cooling cycle and harvest cycle. The process of ice formation is illustrated with respect to formation of ice on a single block as in FIG. 1. However, number of ice blocks (7) may be formed simultaneously in each of the plurality of conductive protrusion assemblies (100). The refrigerant initially flows through the first tube (4) of the of the first conductive protrusion assembly (100) and enters the inlet sub-section (X) in the cooling section (A). The refrigerant flows from the inlet sub-section (X) to the outlet sub-section (Y) through the space/gap that is provided between the bottom most surface of the conductive cup (1) and the bottom end of the conductive strip (3). As indicated by the arrow marks, the refrigerant from the outlet sub-section (Y) of the cooling section (A) flows through the tubes into the inlet sub-section (X) of the neighbouring/adjacent (second) conductive protrusion assembly (100). Thus, by interconnecting the outlet sub-section (Y) of one of the conductive protrusion assembly (100) with the inlet sub-section (X) of the neighbouring sub-section (X), a continuous flow of refrigerant through all the conductive protrusion assemblies (100) may be achieved. During the cooling cycle, the refrigerant may initially be circulated through the first tube (4) of the first conductive protrusion assembly (100). The refrigerant from the first tube (4), enters the inlet sub-section (X) in the cooling section (A). The conductive protrusion assembly (100) may exchange heat with the refrigerant that is being circulated through the cooling section (A). Further, when the cooling section (A) of each of the conductive protrusion assembly (100) reaches a pre-determined temperature, a liquid may be sprayed on to the conductive protrusion assembly (100) by means of a plurality of sprayers [not shown in figures]. As the liquid is sprayed onto the protrusions (100), ice begins to form around the cooling section (A) of each of the plurality of conductive protrusion assembly (100). During the formation of ice, the water that is being sprayed onto the conductive protrusion assemblies (100) may drip downwards due to gravity and trickles down onto the cooling section (A) from the insulating section (B). Since the cooling section (A) of the conductive protrusion assembly (100) is of lesser temperature than the insulating section (B) of the conductive protrusion assembly (100), thus the ice formation occurs around the cooling section (A). The cooling section (A) or the tip of each of the conductive protrusion assembly (100) may act as the centre of ice blocks (7). The ice formed on each of the conductive protrusion assemblies (100), may expand layer by layer symmetrically from the cooling section (A) of the conductive protrusion assemblies (100). As more liquid is sprayed on to the conductive protrusion assembly (100), the ice continues to expand symmetrically with the cooling section (A) as the centre and the thickness of the ice block (7) increases layer by layer around the cooling section (A). However, the thickness of the ice block (7) at the insulating section (B) of the conductive protrusion assembly (100) does not increase since the insulation (9) inside the conductive protrusion assembly (100) prevents the cooling of the surface at the insulating section (B) of the conductive cup (1). Consequently, the cooling section (A) of the conductive protrusion assembly (100) is at a much lower temperature when compared to the insulating section (B) of the conductive protrusion assembly (100), due to the direct flow of refrigerant through the cooling section (A). Since only the tip of the conductive protrusion assembly (100) is used for forming the ice blocks (7) in the initial stages, the ice block (7) is developed layer by layer around the cooling section (A) until a spherical shaped ice block (7) is formed.

During harvest cycle, hot fluid or heating gas may be circulated through the heating tube (6). Since the heating tubes (6) are in direct contact with a flange (10) of the conductive cup (1), the overall temperature of the conductive cup (1) in the insulating section (B) increases. This increases the temperature of a layer of the ice adjacent or contacting the surface of the conductive protrusion assembly (100) in the insulating section (B). Further, hot fluid or heating gas referred as defrost fluid may be circulated through the first tube (4). The hot fluid may enter the cooling section (A) during the harvest cycle and increase the temperature of ice that contacts the surface area of the conductive cup (1) in the cooling section (A). Thus, by enabling the flow of hot fluid through the heating tube (6) and the first tube (4), a layer of ice that contacts the conductive cup (1) may be liquefied. This further facilitates the ice blocks (7) to detach from the surface of the conductive cup (1).

Figure 3:
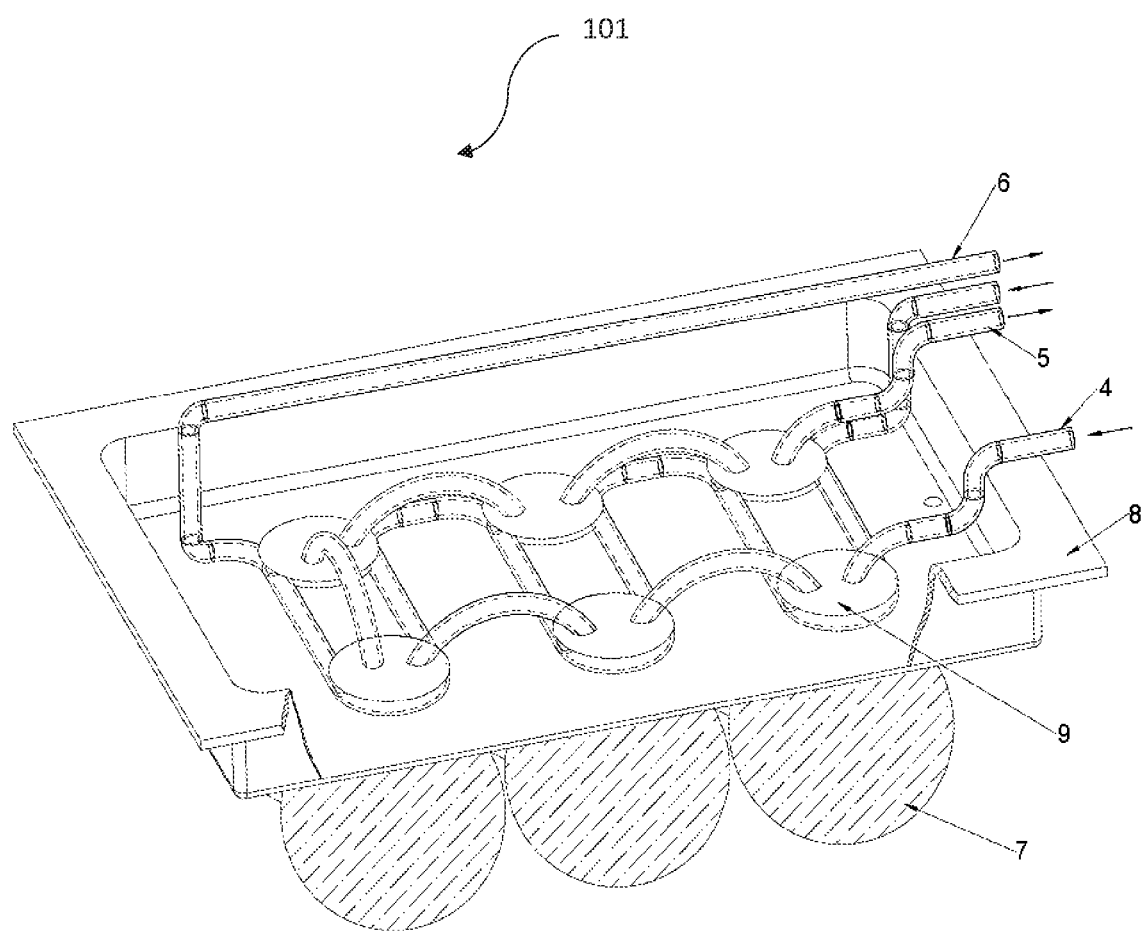
FIG. 3 illustrates a top perspective view of the evaporator for the horizontal spray type ice making machine, in accordance with an embodiment of the present disclosure.

FIG. 3 illustrates a perspective view of the evaporator (101). The evaporator (101) may comprise of a plurality of conductive protrusion assemblies (100) that are suitably housed on the support plate (8). Further, the conductive protrusion assemblies are all interconnected by first and second tubes (4 and 5), thereby providing a channel for the flow of refrigerant through all the conductive protrusion assemblies (100). The refrigerant may enter one of the conductive protrusion assembly (100) by means of the first tube (4). The refrigerant is further circulated through all the conductive protrusion assemblies (100) by means of a plurality of tubes and the refrigerant may exit the conductive protrusion assembly (100) by means of the second tube (5). The conductive protrusion assemblies (100) are also provided with the heating tube (6) for the circulation of hot fluid during the harvest cycle.

In an embodiment of the disclosure, the insulation (9) prevents the surface of the conductive cup (1) in the insulating section (B) from being cooled by the refrigerant that flows through the first and second tubes (4 and 5). As a result, the surface of the conductive cup (1) at the cooling section (A) is at a lower temperature than the temperature surface of the conductive cup (1) at the insulating section (B). Therefore, the thickness of the ice block (7) at the insulating section (B) of the conductive protrusion assembly (100) does not increase, whereas the ice block (7) is developed layer by layer around the cooling section (A) until a spherical shaped ice block (7) is formed.

Figure 4:
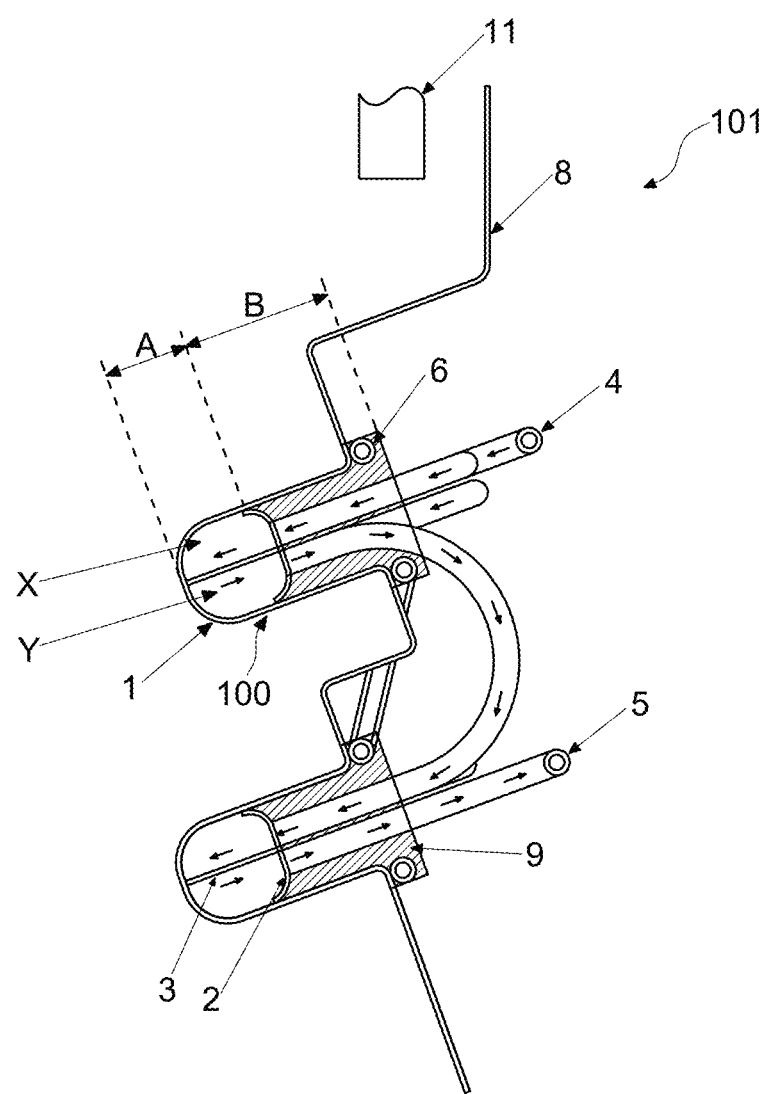
FIG. 4 illustrates a side view of conductive protrusion assemblies, in accordance with an embodiment of the present disclosure in a Vertical Flow type Evaporator.

FIG. 4 illustrates an embodiment of the evaporator (101), where the conductive protrusion assemblies (100) are oriented at a predetermined angle. The conductive protrusion assemblies (100) may be supported by a support plate (8). In an embodiment, the support plate (8) may be made of copper material and the support plate (8) may be shaped to form a plurality of conductive protrusion assemblies (100) as seen from the FIG. 4. Further, a water flow line (11) may be provided at the top end of the evaporator (101) such that the water from the water flow line (11) flows onto the support plate (8) and further comes in contact with the conductive cup (1) of the conductive protrusion assembly (100). The constructional features of conductive protrusion assembly (100) has already been described above. In an embodiment, the conductive protrusion assembly (100) is of material with higher thermal conductivity like copper and support plates (8) are made up of Plastic or non-conducting material.

Figure 5:
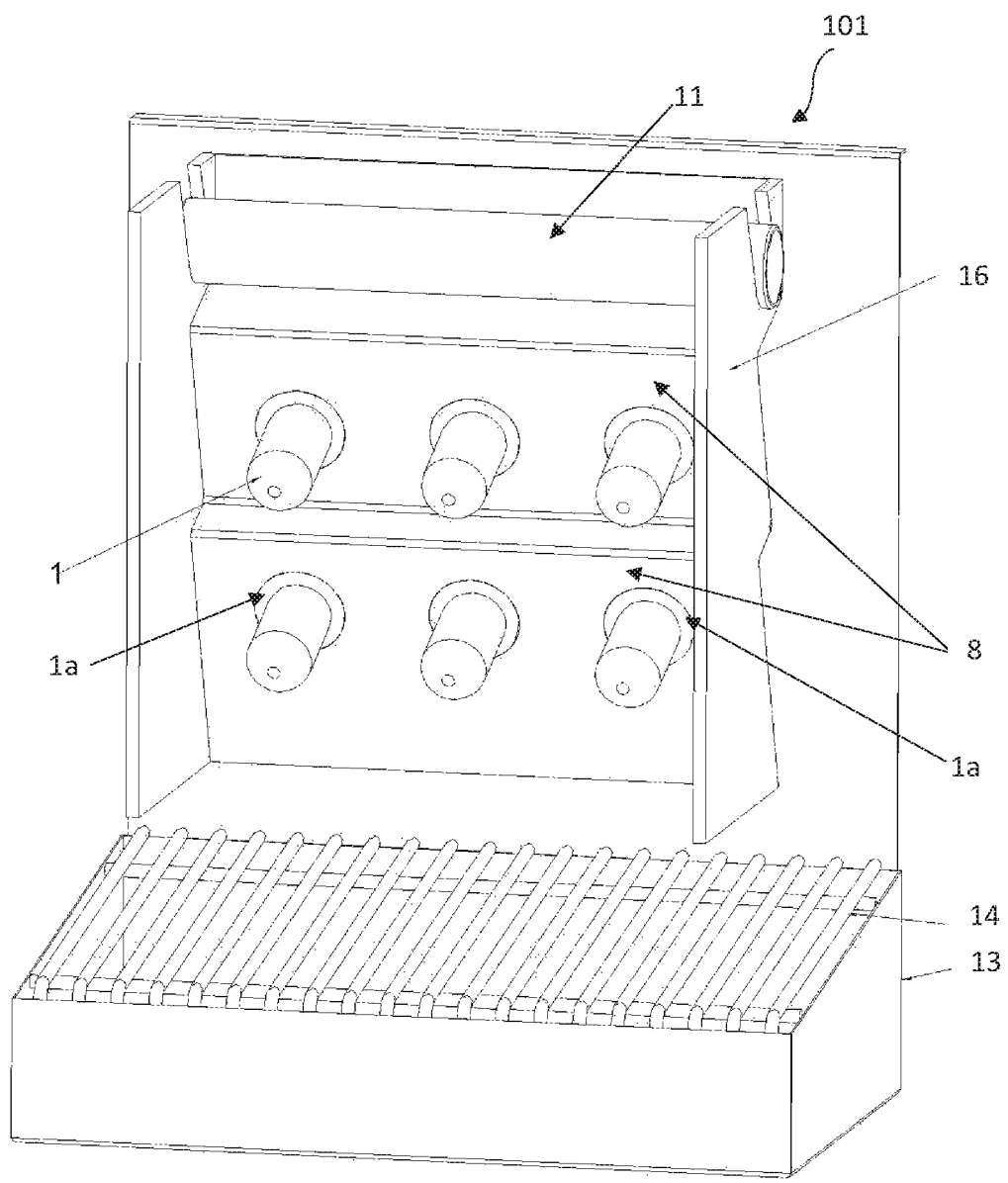
FIG. 5 illustrates a front perspective view of the evaporator, in accordance with an embodiment of the present disclosure.
Figure 6:
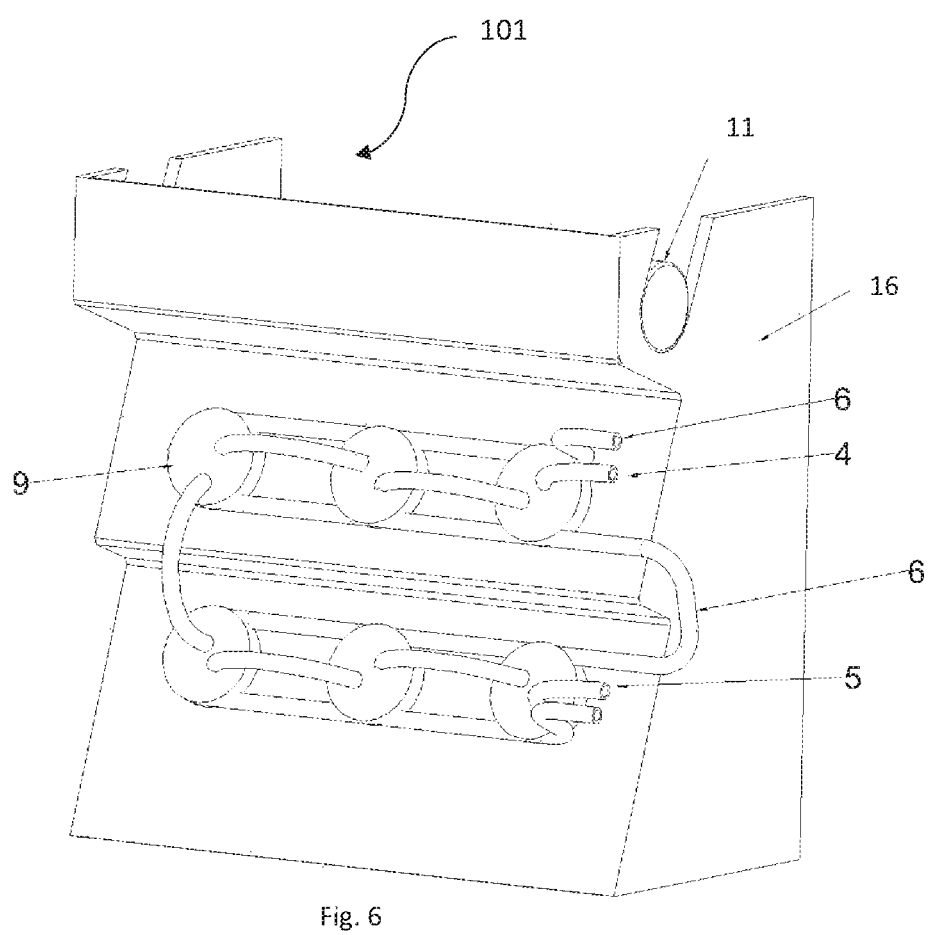
FIG. 6 illustrates a rear perspective view of the Vertical Flow type evaporator, in accordance with an embodiment of the present disclosure.

FIG. 5 and FIG. 6 illustrate a front perspective view and a rear perspective view of the evaporator (101) respectively. A frame (16) defined with a provision at the top end may be configured to accommodate the support plate (8). In an embodiment, the frame (16) and the support plates (8) may be configured to be a single component. A non-metallic sheet may be formed such that the frame (16) and the support plate (8) form the evaporator (101). The support plate (8) accommodated by the frame (16) may be defined with the plurality of first provisions (1a) for accommodating the conductive protrusion assemblies (100). The conductive protrusion assemblies (100) extend through support plate (8) such that the flange (10) of the conductive protrusion assembly (100) is supported by the support plate (8). Further, the water flow line (11) may be accommodated in the provision at the top end of the frame (16). The plurality of conductive protrusion assemblies (100) may be provided in at least one or more rows on the support plate (8). The bottom end of the evaporator (101) may be provided with a tank (13) for storing water (12). Further, the tank (13) may be provided or covered by a plurality of ice slide members (14). The ice slides (14) may be used to guide the ice blocks (7) during the harvest cycle. As seen from the rear perspective view of the evaporator (101) in the FIG. 6, the first and the second tubes (4 and 5) may serve as a channel for the flow of refrigerant or a cooling fluid. The conductive lid (2) may be provided with suitable openings to which the first and second tubes (4 and 5) are attached. These openings on the conductive lid (2) enable the refrigerant to flow from the first tube (4) into the cooling section (A). Further, the heating tube (6) is provided on the flange (10) of the conductive cup (1), where a suitable hot fluid or liquid may be circulated during a harvest cycle.

Figure 7:
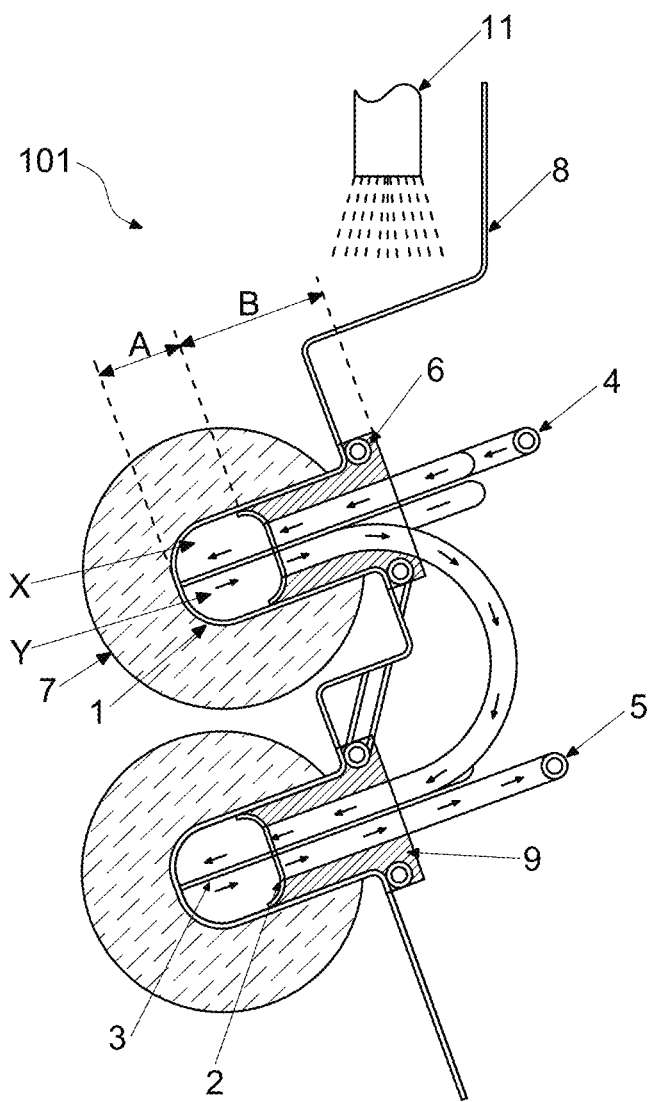
FIG. 7 illustrates a side view of the conductive protrusion assembly during a cooling cycle, in accordance with an embodiment of the present disclosure.

FIG. 7 illustrates a side view of the conductive protrusion assembly (100) during a cooling cycle. During the cooling cycle, the refrigerant may initially be circulated through the first tube (4) of the first conductive protrusion assembly (100). The refrigerant from the first tube (4), enters the inlet sub-section (X) in the cooling section (A). The conductive protrusion assembly (100) may exchange heat with the refrigerant that is being circulated through the cooling section (A). Further, water is supplied onto the surface of the conductive protrusion assembly (100) by means of the water flow line (11). The water from the water flow line (11) comes in contact with the support plate (8). The water then flows on the support plate (8) and comes in contact with the surface of the conductive protrusion assembly (100). As the water flows on the surface of the conductive protrusion assemblies (100), ice begins to form around the cooling section (A) of each of the plurality of conductive protrusion assembly (100). During the formation of ice, the water that flows on the surface of the conductive protrusion assemblies (100) may drip downwards due to gravity and trickles down onto the cooling section (A) from the insulating section (B). Since the cooling section (A) of the conductive protrusion assembly (100) is of lesser temperature than the insulating section (B) of the conductive protrusion assembly (100), the ice formation occurs around the cooling section (A). The cooling section (A) or the tip of each of the conductive protrusion assembly (100) may act as the centre of ice blocks (7). The ice formed on each of the conductive protrusion assemblies (100), may expand layer by layer symmetrically from the cooling section (A) of the conductive protrusion assemblies (100). The ice continues to expand symmetrically with the cooling section (A) as the centre and the thickness of the ice block (7) increases layer by layer around the cooling section (A). However, the thickness of the ice block (7) at the insulating section (B) of the conductive protrusion assembly (100) does not increase since the insulation (9) inside the conductive protrusion assembly (100) prevents the cooling of the surface at the insulating section (B) of the conductive cup (1). Thus, the ice block (7) is developed layer by layer around the cooling section (A) until a spherical shaped ice block (7) is formed.

Figure 8:
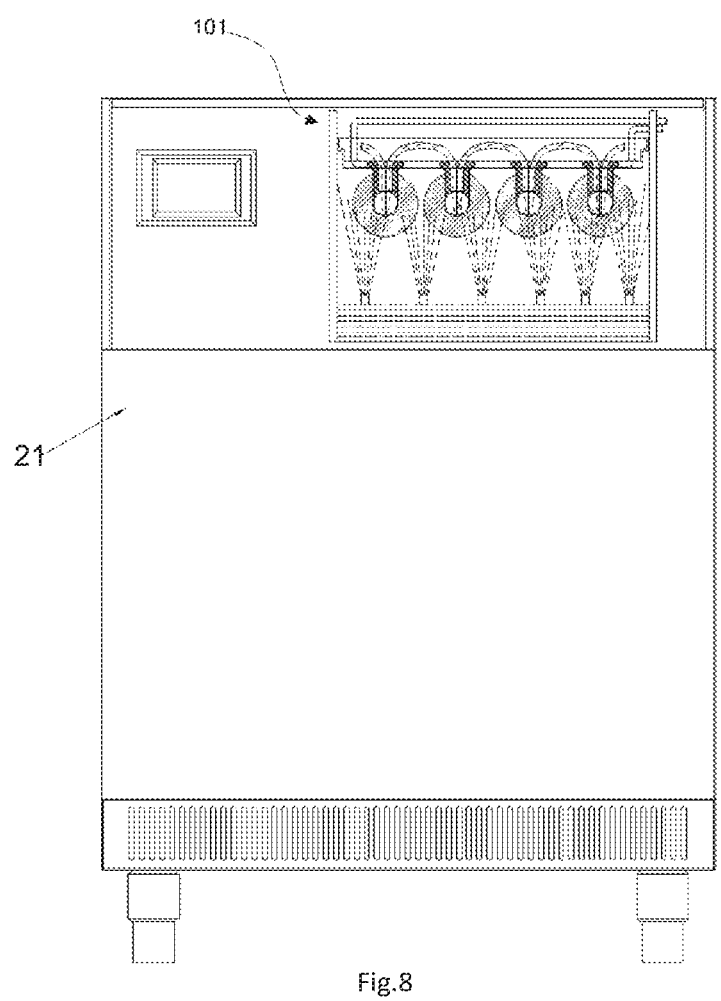
FIG. 8 illustrates an ice making machine with a horizontal flow type evaporator, in accordance with an embodiment of the present disclosure.
Figure 9:
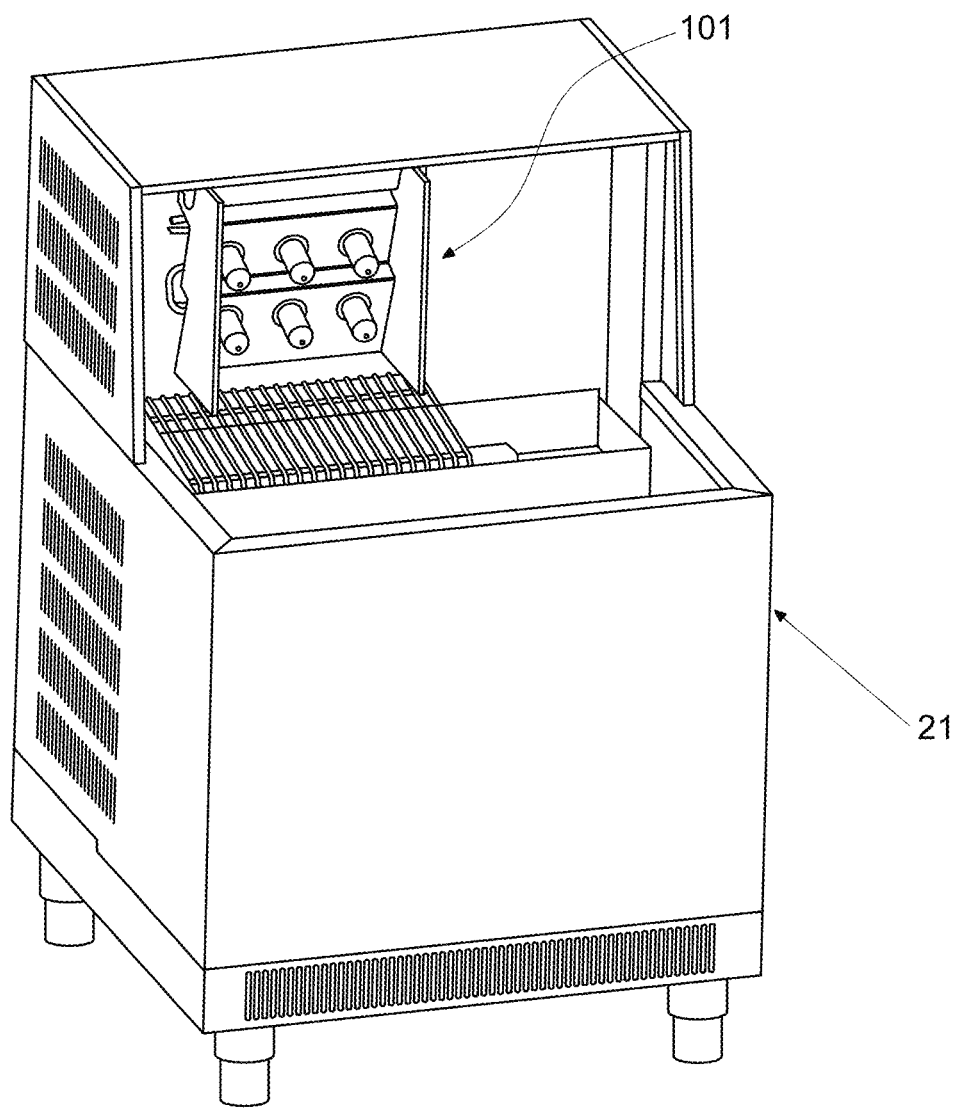
FIG. 9 illustrates an ice making machine with a vertical flow type evaporator, in accordance with an embodiment of the present disclosure.

FIG. 8 illustrates an ice making machine (21) with horizontal flow type evaporator (101) and the FIG. 9 illustrates an ice making machine (21) with vertical flow type evaporator (101). In an embodiment of the disclosure, the evaporator (101) may include a fluid tank provided in the ice making machine (21). With reference to the FIG. 8 i.e., ice making machine (21) with the horizontal flow type evaporator (101), a plurality of nozzles may be configured at the top of the fluid tank. The nozzles may spray water to the surface of the conductive cup (1). The water may freeze on the surface of the conductive cup (1) due to the refrigerant flowing through the conductive cup (1). The positioning of the nozzle sprays may not be limited to the location above the fluid tank and may be positioned in any other location in the ice making machine (21) that facilitates the spray of water onto the conductive cups (1). The ice making machine may also include another compartment or a container for accumulating the ice blocks during the harvest cycle. The ice blocks (8) that are formed by the evaporator (101) may be acquired from the container inside the ice making machine (21). In an embodiment, the temperature of the container storing the ice blocks may be controlled by temperature sensors, a control unit and a refrigerant circuit configured around the container. With reference to the FIG. 9 i.e., ice making machine (21) with the vertical flow type evaporator (101), the water may flow on the surface of the conductive cups (1) by the water flow nozzle (11) configured on the evaporator (101) as described above.

Figure 10:
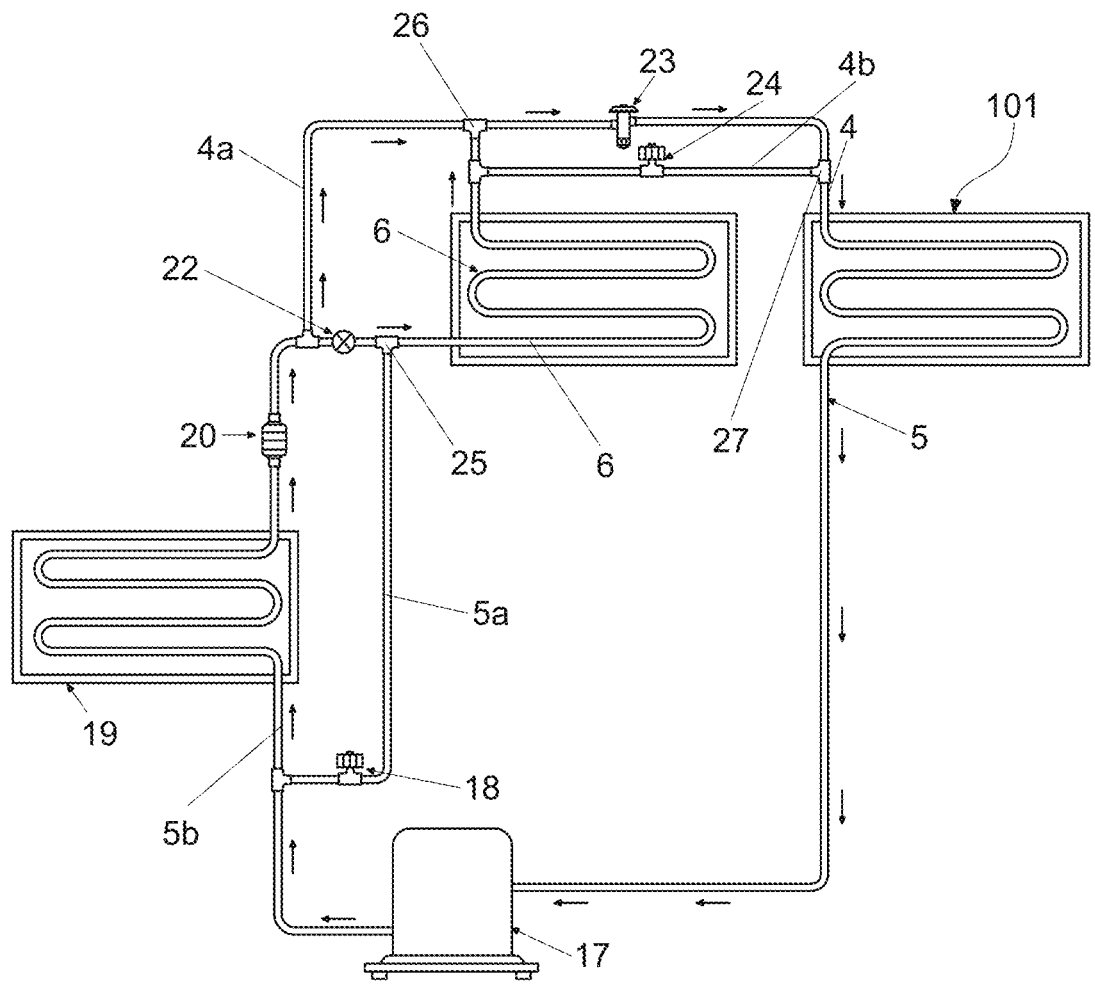
FIG. 10 illustrates circuitry of a flow of refrigerant in the ice making machine during cooling cycle, in accordance with an embodiment of the present disclosure.

FIG. 10 illustrates a flow of refrigerant in the ice making machine (21) during the cooling cycle. The ice making machine (21) may include the evaporator (101) and the second tube (5) or the refrigerant line facilitating the outward flow of refrigerant from the evaporator (101) may be coupled to the compressor (17). The refrigerant flow line that exists the compressor (17) may split up into a first refrigerant flow line (5a) and a second refrigerant flow line (5b). The first refrigerant flow line (5a) may be directed through a hot gas valve (18) and the second refrigerant flow line (5b) may be directed through a condenser (19). A dryer (20) may also be configured along a second refrigerant flow line (5b) after the condenser (19). The first refrigerant flow line (5a) and the second refrigerant flow line (5b) may meet at a first intersection point (25) and may converge to define the second tube (6). Further, a third refrigerant flow line (4a) may extend from the second refrigerant flow line (5b) at a point between the line (20) and the first intersection point (25). A balancing valve (22) may be configured between the first intersection point (25) and the point where the third refrigerant flow line (4a) extends from the second refrigerant flow line (5b). The second tube (6) extending from the first intersection point (25) may converge with the third refrigerant flow line (4a). Further, an expansion valve (23) may be configured on the third refrigerant flow line (4a). A fourth refrigerant flow line (4b) including a hot gas valve (24) may be configured to extend between the second tube (6) and the third refrigerant flow line (4a). The fourth refrigerant flow line (4b) may meet the third refrigerant flow line (4a) at a second intersection point (27). The fourth refrigerant flow line (4b) may converge with the third refrigerant flow line (4a) at the second intersection point (27) to define the first tube (4). The first tube (4) may further be directed through the evaporator (101).

The refrigerant may initially flow from the evaporator (101) to the compressor (17). The compressor (17) may increase the temperature of the refrigerant in vapour state and may pressurize the refrigerant. The refrigerant may further flow through the second refrigerant flow line (5b) into the condenser (19). The condenser (19) may transfer the heat from the refrigerant to another medium, such as air or water. By rejecting heat, the gaseous refrigerant condenses to liquid inside the condenser (19). The liquid refrigerant which is still at a high temperature and high pressure, may further flow through the dryer (20). The dryer (20) may be a filter that absorbs impurities and/or moisture from the refrigerant. The refrigerant may further flow through the third refrigerant flow line (4a) to the expansion valve (23). The expansion valve (23) removes pressure from the liquid refrigerant and allows the refrigerant to expand or change the state from the liquid to the vapor state. The high temperature and high-pressure liquid refrigerant entering the expansion valve (23) may be converted to the vapour state and may reach very low temperatures. With further reference to FIG. 1 and FIG. 10, the low temperature refrigerant may flow through the first tube (4) into the conductive cup (1) where the refrigerant absorbs the heat from the water on the outer surface of the conductive cup (1) and solidifies the water on the outer surface of the conductive cup (1). With further reference to the FIG. 10, the refrigerant that exits the dryer (20) may partially be redirected by the balancing valve (22) into the second tube (6). Referring back to the FIG. 1, the refrigerant flowing through the second tube (6) that is positioned on top of the flange (10) defined by the conductive cup (1), ensures Since the refrigerant from the condenser (19) at high temperature is redirected through the second tube (6), the formation of ice along the top region of the conductive cup (1) is restricted. The ice is majorly formed around the cooling section (A) of the conductive cup (1) and the formation of ice along the insulating section (B) as well as the top end of the conductive cup (1) is minimized due to the supply of high temperature refrigerant through the second tube (6). Consequently, the ice is formed with the spherical shape as seem from the FIG. 1.

Figure 11:
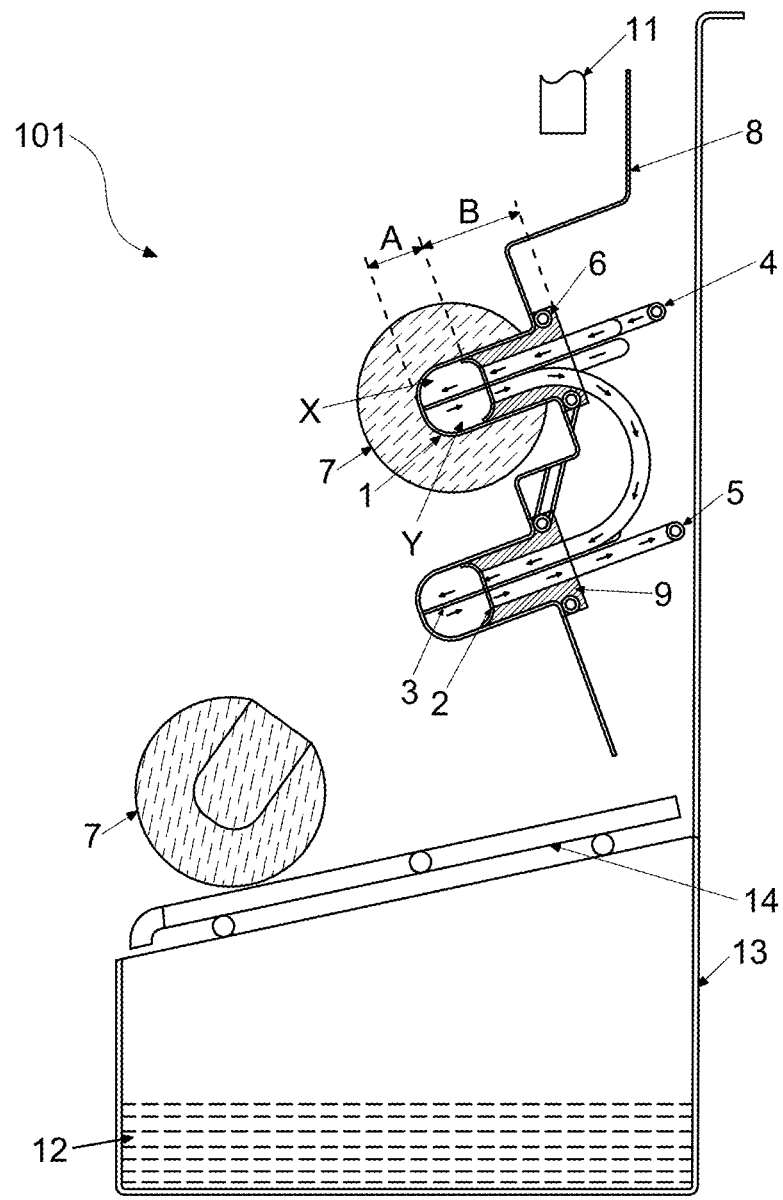
FIG. 11 illustrates a side view of the conductive protrusion assembly during a harvest cycle, in accordance with an embodiment of the present disclosure.

FIG. 11 illustrates a side view of the conductive protrusion assembly (100) during a harvest cycle. During harvest cycle, hot fluid or heating gas commonly referred as defrost fluid may be circulated through the heating tube (6). Since the heating tubes (6) are in direct contact with the conductive cup (1), the overall temperature of the conductive cup (1) in the insulating section (B) increases. This increases the temperature of a layer of the ice adjacent or contacting the surface of the conductive protrusion assembly (100) in the insulating section (B). Further, hot fluid or heating gas may be circulated through the first pipe (4). The hot fluid may enter the cooling section (A) during the harvest cycle and increase the temperature of ice that contacts the surface area of the conductive cup (1) in the cooling section (A). Thus, by enabling the flow of hot fluid through the heating tube (6) and the first tube (4), a layer of ice that contacts the conductive cup (1) is liquefied. This further facilitates the ice blocks (7) to detach from the surface of the conductive cup (1). Further, as the ice blocks (7) detach from the conductive protrusion assembly (100), the ice blocks (7) drop onto the ice slide (14). The ice blocks (7) slide on the surface of the ice slide (14) and may be directed to a suitable storage unit.

Figure 12:
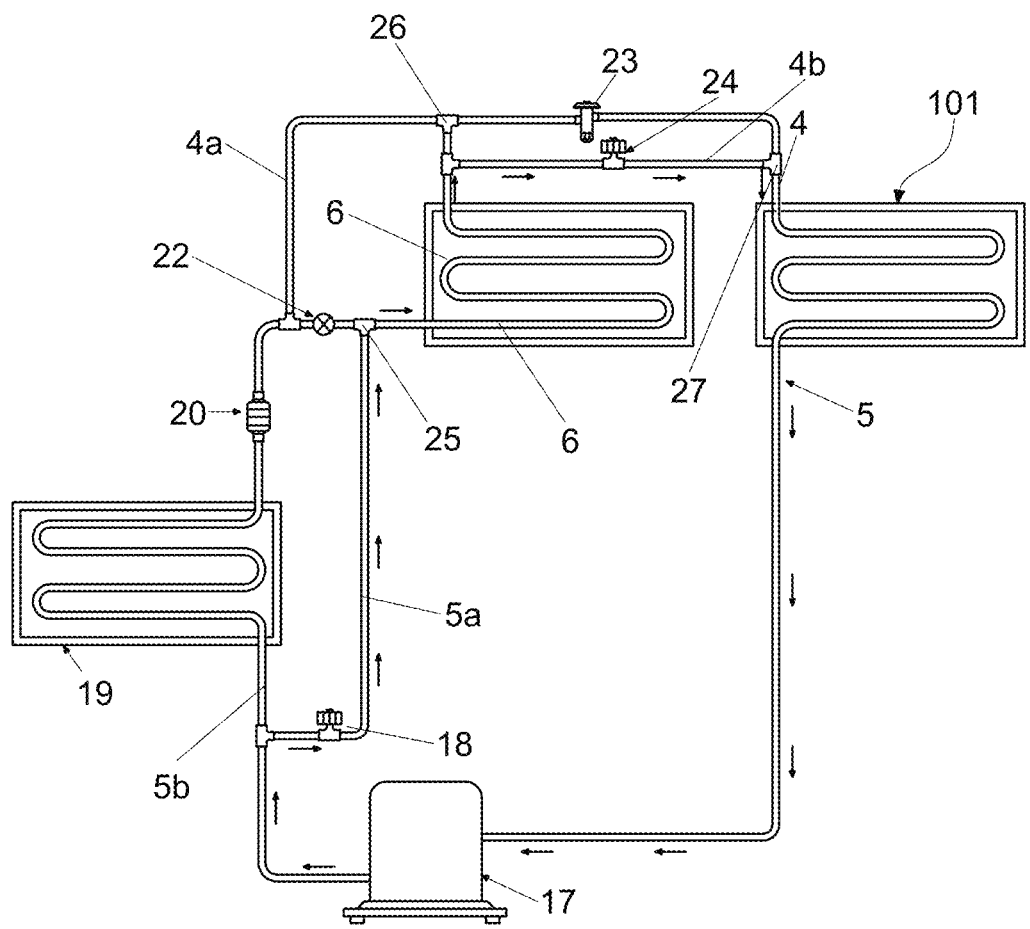
FIG. 12 illustrates circuitry of the flow of refrigerant in the ice making machine during harvest cycle, in accordance with an embodiment of the present disclosure.

FIG. 12 illustrates a flow of refrigerant in the ice making machine (21) with during the harvest cycle. The refrigerant may initially flow from the evaporator (101) to the compressor (17). The compressor (17) may increase the temperature of the refrigerant in vapour state and may pressurize the refrigerant. The refrigerant may further flow through the first refrigerant flow line (5a) through the hot gas valve (18). The balancing valve (22) during the harvest cycle may be closed. Consequently, the high temperature vapor refrigerant may flow through the first refrigerant flow line (5a) into the second tube (6) through the first intersection point (25). With further reference to FIG. 1, the high temperature refrigerant flowing through the second tube (6) melts a layer of the ice formed on the surface of the conductive cup (1) along the top region of the conductive cup (1). The high temperature refrigerant may further flow through the fourth refrigerant flow line (4b) and through the hot gas valve (24) configured along the fourth refrigerant flow line (4b). The high temperature refrigerant further enters the first tube (4) through the third intersection point 27. The flow of high temperature refrigerant through the heating tube (6) and the first tube (4)a causes a layer of ice that contacts the conductive cup (1) to liquefy. This further facilitates the ice blocks (7) to detach from the surface of the conductive cup (1) during the harvest cycle.

Figure 13:
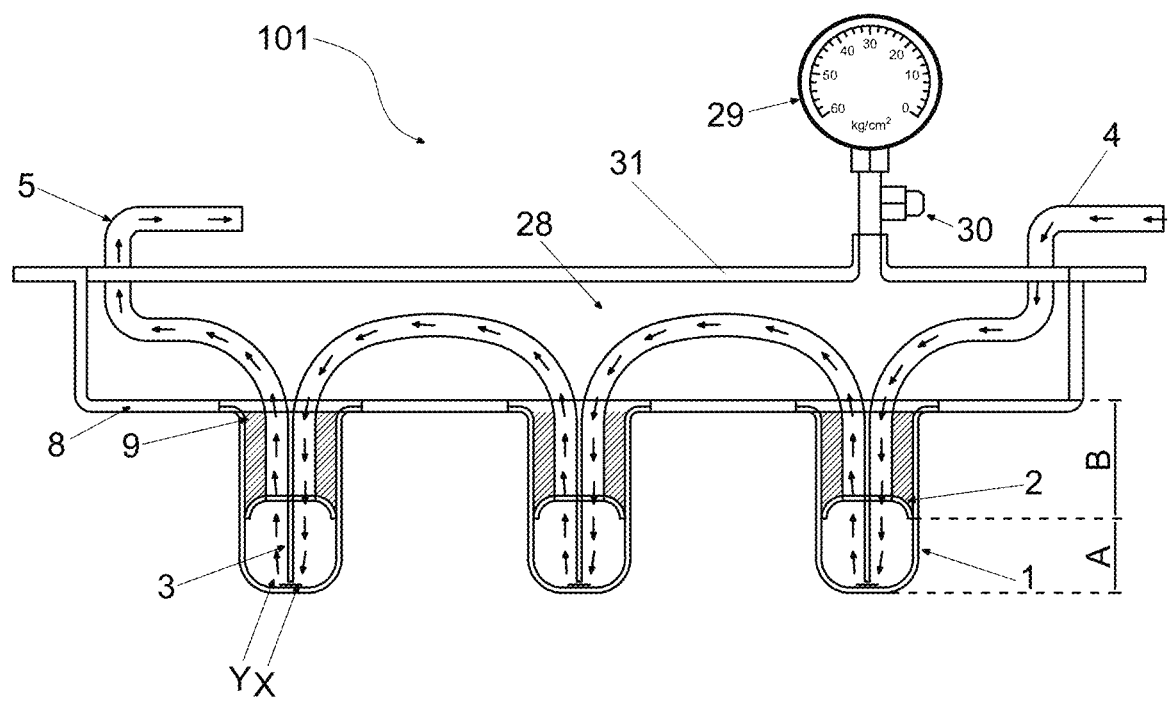
FIG. 13 illustrates an embodiment of the evaporator for the horizontal spray type ice making machine with vacuum or other insulation on a support plate of the evaporator, in accordance with an embodiment of the present disclosure.
Figure 14:
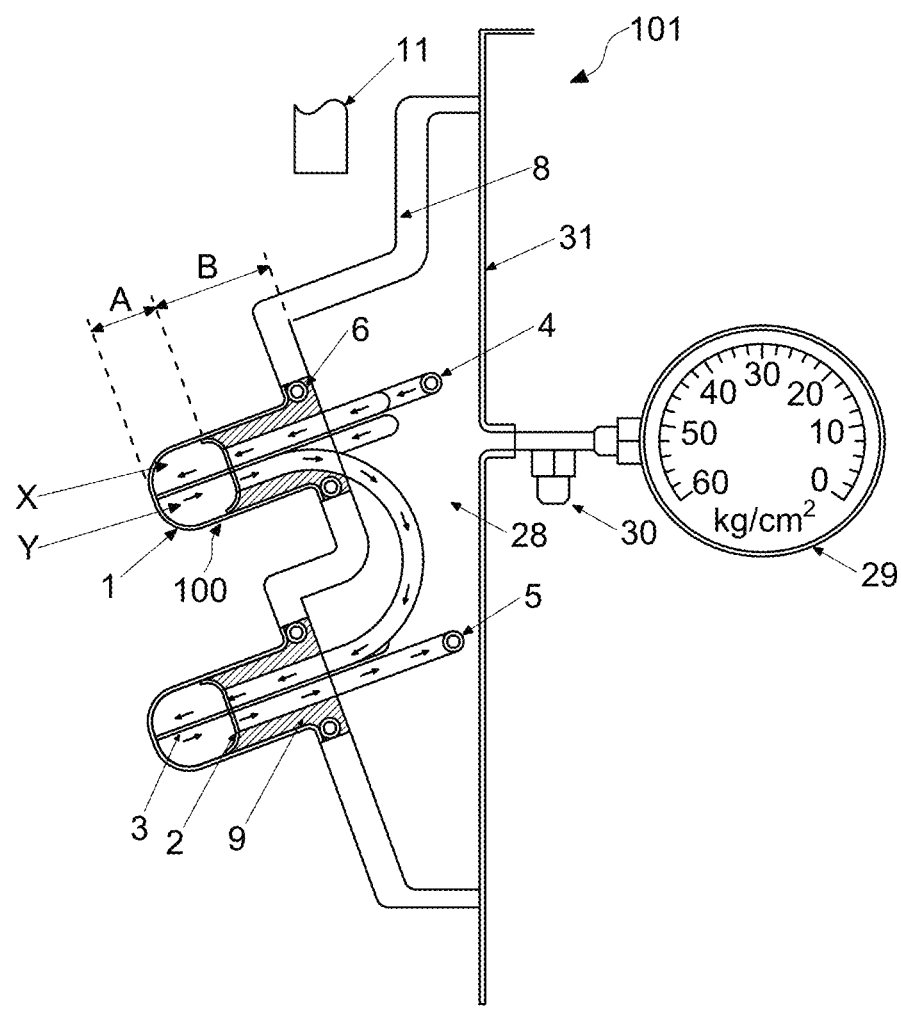
FIG. 14 illustrates an embodiment of the evaporator for vertical flow type ice making machine with vacuum or other insulation on a support plate of the evaporator, in accordance with an embodiment of the present disclosure.

FIG. 13 and FIG. 14 illustrates an embodiment of the evaporator (101) in horizontal type ice making machine (21) and vertical flow type ice making machine (21) respectively with a vacuum or suitable insulation (28) on the support plate (8) of the evaporator (101). With further reference to FIG. 3, the support plate (8) provided to house the conductive cups (1) may define a hollow section. Refereeing back to FIG. 13, the hollow section defined by the support plate (8) may be covered by an enclosing member (31). The enclosing member (31) may be defined with multiple provisions for accommodating the first tube (4), the second tube (6) and a vacuum gauge (29).

Further, the hollow section defined between the support plate (8) and the enclosing member (31) may be filled with an insulating material (28). In an embodiment, a vacuum may be created in the hollow section between the support plate (8) and the enclosing member (31). The vacuum may act as an insulation (28) in the hollow section. The hollow section is coupled to the vacuum gauge (29) through the enclosing member (31). The vacuum gauge (29) may also be provided with a vacuum valve (30) to monitor and control the vacuum that is created inside the hollow section defined between the between the support plate (8) and the enclosing member (31).

The support plate (8) ay be defined with an outer surface (8a). During the cooling cycle, the refrigerant flowing through the first tube (4) also partially cools the support plate (8). Further, due to the moisture content in the atmospheric air, condensation occurs on the outer surface (8a) of the support plate (8). The condensed water drips down form the outer surface (8b) of the support plate (8) and often gets accumulated in the fluid tank. Further, bacterial formation on the outer surface (8a) of the support plate (8) increases due to the constant condensation of water during each cooling cycle. Consequently, the water that drips from the outer surface (8a) of the support plate (8) is contaminated and the ice blocks that are formed from this water as the water is re-circulated are also contaminated. The provision of the insulation (28) within the hollow section between the support plate (8) and the enclosing member (31) ensures that the condensation of moisture to water droplets is prevented during the cooling cycle. The insulation (28) ensures that the condensation does not occur on the outer surface (8a) of the support plate (8) and thereby formation of water droplets on the outer surface (8a) of the support plate (8) is also prevented. Consequently, the formation of the bacteria on the outer surface (8a) of the support plate (8) is also prevented. Thus, improved hygienic operational conditions of the evaporator (101) are enabled by configuring the insulation (28) between the support plate (8) and the enclosing member (31). The above, configuration of providing insulation (28) may also be provided for Vertical flow type evaporators (101) as seen from FIG. 14.

Figure 15:
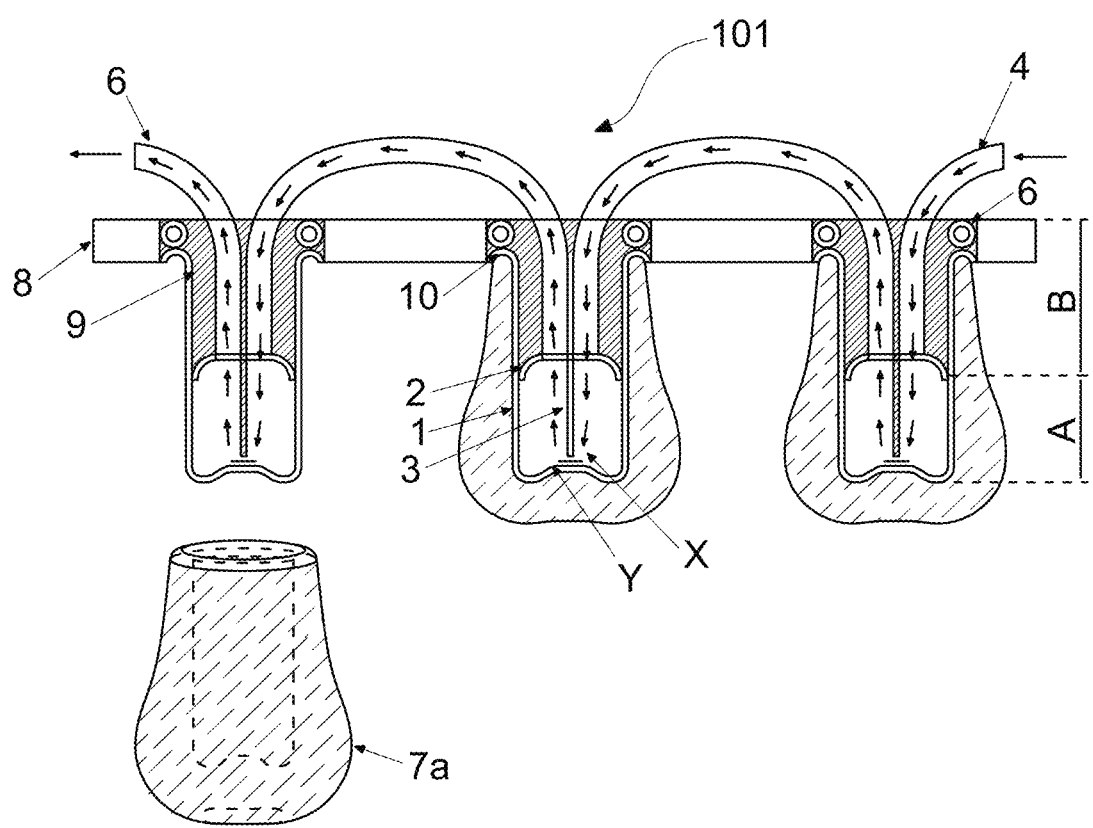
FIG. 15 illustrates an embodiment of the conductive protrusion assembly for making shot glass type ice blocks, in accordance with an embodiment of the present disclosure.
Figure 16:
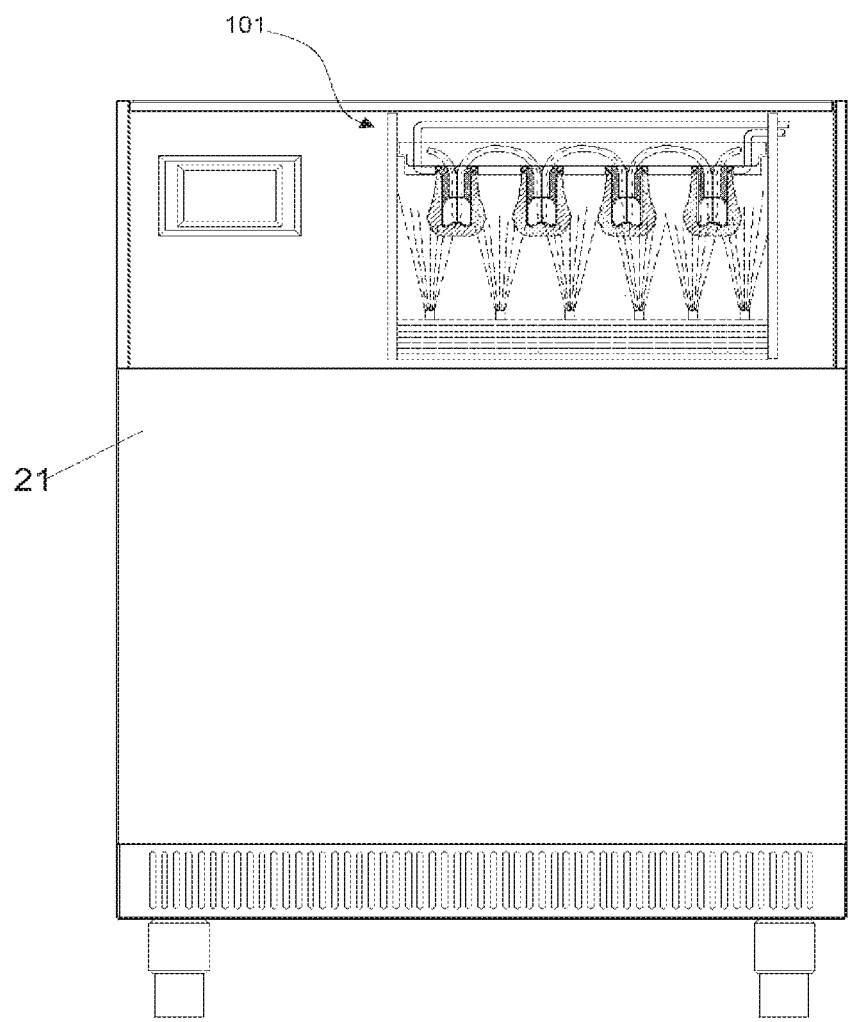
FIG. 16 illustrates an ice making machine including horizontal flow type evaporator with the conductive protrusion assembly for making shot glass type ice blocks, in accordance with an embodiment of the present disclosure.

FIG. 15 illustrates an embodiment of the conductive protrusion assembly (100) for making shot glass (7a) type ice blocks and FIG. 16 illustrates an ice making machine (101) including horizontal flow type evaporator (101) with the conductive protrusion assembly (100) for making shot glass (7a) type ice blocks. In an embodiment, the balancing valve (22) in the ice making machine (21) may be removed to make shot glass (7a) type ice blocks. In the absence of the balancing valve (22), the high temperature refrigerant is not redirected to the second tube (6) [with reference to FIG. 10]. Consequently, there is no increase in temperature along the upper regions of the conductive cup (1) due to which there exists no restrictions to the formation of the ice at the top region of the conductive cup (1). Further, the bottom end of the conductive cup (1) is configured in an inverted "V" shape. The above configuration of removing the balancing valve (22) and providing a "V" shaped conductive cup (1) at the bottom enables the formation of shot glass (7a) type ice blocks. As seen from FIG. 15, the ice is formed along the top region of the conductive cup (1) in absence of the high temperature refrigerant through the second tube (6). Consequently, an elongated shaped ice block with a hollow central region that is open at one end is formed. The above configuration also ensures that the shot glass (7a) is formed with heavier or thicker bottom and side walls which prevents it from breaking or easily melting out. The walls of the shot glass (7a) type ice block is thinner at the top end due to the insulating section (B) of the conductive cup (1). The thickness of the walls gradually increases along the lower regions of the shot glass (7a) type ice blocks. The thickness along the lower regions of the ice blocks may be greater since cooling section (A) of the conductive cup (1) ensures better and thicker formation of ice blocks in the absence of any insulation. Consequently, the shot glass (7a) type ice blocks will comprise of thinner upper regions which enable the user to firmly hold the shot glass (7a) and thicker lower regions of the shot glass (7) prevent the ice block from melting away easily and also prevent the easy breakage of the shot glass (7a).

In an embodiment of the disclosure, a spherical shaped ice block (7) may be produced without the use of a mould by providing the conductive protrusion assembly (100) with an insulating section (B) and a cooling section (A).

In an embodiment of the disclosure, the conductive protrusion assembly (100) is efficient since a small surface area (i.e., the cooling section) is effectively cooled by the refrigerant.

In an embodiment, the shot glass (7a) with heavier or thicker bottom does not break or easily melt which may be produced by closing the balancing valve (22).

In an embodiment, the insulation (28) between the support plate (8) and the enclosing member (31) provides improved hygienic operational conditions of the evaporator (101).

EQUIVALENTS

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding the description may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B. and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B. and C together, etc.). It will be further understood by those within the art that virtually any disjunctive word and/or phrase presenting two or more alternative terms, whether in the description, or drawings, should be understood to contemplate the possibilities of including one of the terms, either of the terms, or both terms. For example, the phrase "A or B" will be understood to include the possibilities of "A" or "B" or "A and B."

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated in the description.

Table of Referral Numerals:

| Referral numeral | Description |
| --- | --- |
| 1 | Conductive cup |
| 1a | First provision |
| 2 | Conductive lid |
| 3 | Conductive strip |
| 4 | First tube |
| 4a | Third refrigerant flow line |
| 4b | Fourth refrigerant flow line |
| 5 | Second tube |
| 5a | First refrigerant flow line |
| 5b | Second refrigerant flow line |
| 6 | Heating tube |
| 6a | Second provision |
| 7 | Ice block |
| 8 | Support plate |
| 9 | Insulation |
| 10 | Flange of the conductive cup |
| 11 | Water flow nozzle |
| 12 | Water |
| 13 | Tank |
| 14 | Ice slide |
| 15a | Inlet port |
| 15b | Outlet port |
| 16 | Frame |
| 17 | Compressor |
| 18 | Hot gas valve |
| 19 | Condenser |
| 20 | Dryer |
| 21 | Ice making machine |
| 22 | Balancing valve |
| 23 | Expansion valve |
| 24 | Hot gas valve |
| 25 | First intersection point |
| 26 | Second intersection point |
| 27 | Third intersection point |
| 28 | Insulation |
| 29 | Vacuum gauge |
| 30 | Vacuum valve |
| 100 | Conductive protrusion assembly |
| 101 | Evaporator |
| X | Inlet sub-section |
| Y | Outlet sub-section |

We claim:

1. A conductive protrusion assembly (100) for an evaporator (101) of an ice-making machine, the conductive protrusion assembly (100) comprising:
   a conductive cup (1) defining a chamber (C), the conductive cup is supportable by a support plate (8) of the evaporator (101);
   a conductive lid (2) fixed within the chamber (C), dividing the chamber into a cooling section (A) and an insulating section (B),
   wherein, the insulating section (B) of the conductive cup (1) is packed with an insulation material,
   wherein, the conductive lid (2) is defined with an inlet port (15a) and an outlet port (15b) to circulate a cooling fluid through the cooling section (A); and
   the insulating section (B) is defined with a flow passage to allow flow of a defrost fluid.

2. The conductive protrusion assembly (100) as claimed in claim 1 comprising, a conductive strip (3) extending from the conductive lid (2) into the cooling section (A) of the conductive cup (1).

3. The conductive protrusion assembly (100) as claimed in claim 2, wherein the conductive strip (3) is configured between the inlet port (15a) and the outlet port (15b) defined in the conductive lid (2) and, the conductive strip (3) separates the cooling section (A) into an inlet section (X) and an outlet section (Y).

4. The conductive protrusion assembly (100) as claimed in claim 3, wherein the inlet section (X) is in fluid communication with the first tube (4) for receiving the refrigerant from the first tube (4) and the outlet section (Y) is in fluid communication with the second tube (5) for directing the refrigerant out of the cooling channel (A).

5. The conductive protrusion assembly (100) as claimed in claim 1, wherein the conductive cup (1) is defined with a flange (10) at a brim, wherein, the flange (10) is receivable by the support plate (8) for supporting the conductive cup (1).

6. The conductive protrusion assembly (100) as claimed in claim 1, wherein the flow passage is defined proximal to the flange (10), and the defrost fluid conductively transfers heat to the conductive cup (1).

7. The conductive protrusion assembly (100) as claimed in claim 1, wherein thermal conductivity of a material of the conductive protrusion assembly (100) is higher than the thermal conductivity of a material of the support plate (8).

8. An evaporator (101) for an ice making machine, the assembly (101) comprising:
   a frame (16);
   at least one support plate (8) supported by the frame (16);
   a water flow line (11) provided at a top end of the frame (16), wherein the water flow line (11) is positioned upstream to each of the at least one support plate (8);
   the at least one support plates (8) defined with at least one first provision (1a), wherein at least one first provisions (1a) is configured to receive a conductive protrusion assembly (100), the conductive protrusion assembly (100) comprising:
      a conductive cup (1) defining a chamber (C), the conductive cup is supportable by a support plate (8) of the evaporator (101);
      a conductive lid (2) fixed within the chamber (C), dividing the chamber into a cooling section (A) and an insulating section (B),
   wherein, the insulating section (B) of the conductive cup (1) is packed with an insulation material,
   wherein, the conductive lid (2) is defined with an inlet port (15a) and an outlet port (15b) to circulate a cooling fluid through the cooling section (A); and
      the insulating section (B) is defined with a flow passage to allow flow of a defrost fluid.

9. The evaporator (101) as claimed in claim 8, comprising, a conductive strip (3) extending from the conductive lid (2) into the cooling section (A) of the conductive cup (1).

10. The evaporator (101) as claimed in claim 9, wherein the conductive strip (3) is configured between the inlet port (15a) and the outlet port (15b) defined on the conductive lid (2) and, the conductive strip (3) separates the cooling section (A) into an inlet section (X) and an outlet section (Y).

11. The evaporator (101) as claimed in claim 10, wherein the inlet section (X) is in fluid communication with the first tube (4) for receiving the refrigerant from the first tube (4) and the outlet section (Y) is in fluid communication with the second tube (5) for directing the refrigerant out of the cooling channel (A).

12. The evaporator (101) as claimed in claim 8, wherein the conductive cup (1) is defined with a flange (10) at a brim, wherein, the flange (10) is receivable by the support plate (8) for supporting the conductive cup (1).

13. The evaporator (101) as claimed in claim 8, wherein the flow passage is defined proximal to the flange (10), and the defrost fluid conductively transfers heat to the conductive cup (1).

14. The evaporator (101) as claimed in claim 8, wherein thermal conductivity of a material of the conductive protrusion assembly (100) is higher than the thermal conductivity of a material of the support plates (8).

15. The evaporator (101) as claimed in claim 8 comprises, a balancing valve (22) for partially redirecting a high temperature refrigerant from a second refrigerant flow line (5b) to the second tube (6).

16. The evaporator (101) as claimed in claim 8 comprises, an insulation (28) configured between the support plate (8) and the enclosing member (31) of the evaporator (101) for preventing condensation on an outer surface (8a) of the support plate (8).

17. The evaporator (101) as claimed in claim 16 wherein, the insulation (28) is created by configuring vacuum in a region between the support plate (8) and the enclosing member (31).

18. The evaporator (101) as claimed in claim 8 comprises, closing the balancing valve (22) during the cooling cycle for making a shot glass (7a) type ice block.

19. A vertical flow type icemaking machine comprising an evaporator (101) as claimed in claim 8.

* * * * *